Sept. 27, 1966  G. GAMBERINI  3,275,259
SUPPLY ROLL BRAKE
Filed April 15, 1964

INVENTOR.
GOFFREDO GAMBERINI
BY
ATTORNEY 3,275,259
SUPPLY ROLL BRAKE
Goffredo Gamberini, 9/3° Via Mazzini, Bologna, Italy
Filed Apr. 15, 1964, Ser. No. 359,909
Claims priority, application Italy, May 6, 1963,
162/169
5 Claims. (Cl. 242—75.44)

The present invention relates to spool holders for spools of any material, in particular for spools of strip or thread of paper, fabric, cellophane, or the like. The invention is applicable in particular to packing, packaging, cellophaning and similar machines, although it is not limited only to these types of machines but can be applied wherever it becomes necessary or desirable.

In the known spool holders, the reel or shaft carrying the spool is normally loosely rotatable, and the unwinding of the strip from the spool occurs solely by action of the reaction exerted by the strip itself. This method, however, presents various disadvantages, especially when the spool has a considerable diameter and is therefore quite heavy. In fact, in this case the spool presents a high moment of inertia, owing to which it either does not stop promptly when the traction exerted by the strip ceases, or, to eliminate the pull, special means must be provided for the continuous braking, and then the strength of the strip which unwinds from the spool may be insufficient to overcome the braking force, especially upon starting up after a stoppage, so that frequent ruptures of the strip may occur, in particular when the spool is made of delicate material.

The invention aims to eliminate the above disadvantages and consists essentially in the fact that the spool is rotated positively, by means of a friction transmission and a free-wheel device, in the same direction as the unwinding of the strip and with a speed slightly lower than the unwinding of said strip.

In this way, the strip unwinds from the spool with a very light tractive effort, that is, only with the tractive effort necessary to overcome the difference between the speed of rotation positively imparted to the spool and the effective speed of unwinding of the strip, which is slightly greater than that obtained with the forced actuation. This small tractive effort insures the necessary tension of the strip and is at the same time almost entirely independent of the weight and hence of the moment of inertia of the spool, so that it can be selected so as to be sustained without ruptures even by the most delicate strips.

To obtain the automatic arrest of the rotation of the spool when the traction exerted by the strip unwinding from the spool ceases, the invention provides means sensitive to the tension of the strip and susceptible of actuating, for example electrically, means for braking and arresting the spool when the tension of the strip drops below a certain limit. Preferably, in this case, while the rotation of the spool is braked, the mechanism for the forced actuation thereof remains in operation, causing the friction transmission to slip, so that the forced rotation of the spool is resumed as soon as the predetermined tension of the strip is restored and the means sensitive to this tension release the spool by slackening the brake thereof.

These and other characteristics of the invention and the advantages deriving therefrom will become evident from the following description of a preferred form of construction, illustrated by way of non-limitative example in the annexed drawing, in which.

Figure 3:
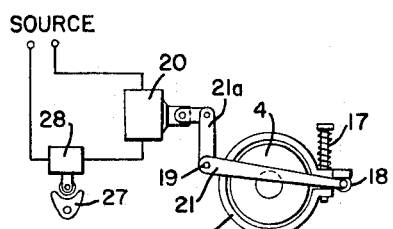
FIG. 3 is a schematic diagram of the electrical system operating a spool brake mechanism.

The illustrated form of construction refers to the spool holder of a cellophaning machine or the cellophaning group of a packaging machine, for example of cigarettes or the like. The cellophane strip 1 unwinds from a spool 2 on a reel 3 or the like. It is understood, however, that the invention is not limited to that example of construction, but that the strip 1 may be of any material, such as paper, fabric, plastic material or the like, and that instead of the strip 1 a thread or ribbon of any material may be wound on the reel 3.

The reel 3, which may be constructed in any other manner or replaced by any other equivalent organ, is fixed on a sleeve 4 which is rotatably mounted on the shaft 5 and is coupled with said shaft by means of a free-wheel device 6.

The shaft 5 is supported by the frame 7 of the machine by means of a bearing 8 and is actuated positively in the same direction 9 in which spool 2 rotates when strip 1 unwinds therefrom; the forced rotation of shaft 5 is obtained by means of a chain drive 10 which, through a pinion 11, drives a toothed wheel 12 mounted slidably and rotatably on said shaft 5. This toothed wheel 12 is coupled to shaft 5 by means of a friction coupling, formed by a disk 13 which is cottered on said shaft 5. The toothed wheel 12 is axially compressed against the disk 13, by action of a spring 15 and with interposition of a packing 14 of suitable friction material.

The free wheel device 6 is constructed in such manner as to permit that the shaft 5 takes along the sleeve 4, and hence the spool 2, 3 secured thereon, in rotation in the direction 9 of unwinding of strip 1. At the same time, the free-wheel device 6 permits the free rotation of sleeve 4 and hence of spool 2, 3 on shaft 5 in the same direction 9 of unwinding of strip 1, with an angular speed greater than the forced speed imparted to the spool by said shaft 5.

The rotation of sleeve 4 and hence of spool 2, 3 can be arrested by means of a brake 16. This brake 16 is applied by a spring 17, while it can be released by means of a cam 18, whose shaft 19 is controlled by an electromagnet 20 by means of a lever arm 21. During operation, the electromagnet 20 is normally excited, and cam 18 maintains the brake 16 released counter to the action of spring 17.

Figure 1:
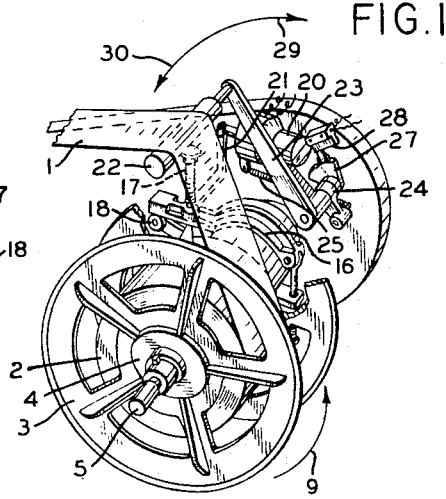
FIGURE 1 illustrates in perspective the spool holder of a cellophaning machine.
Figure 2:
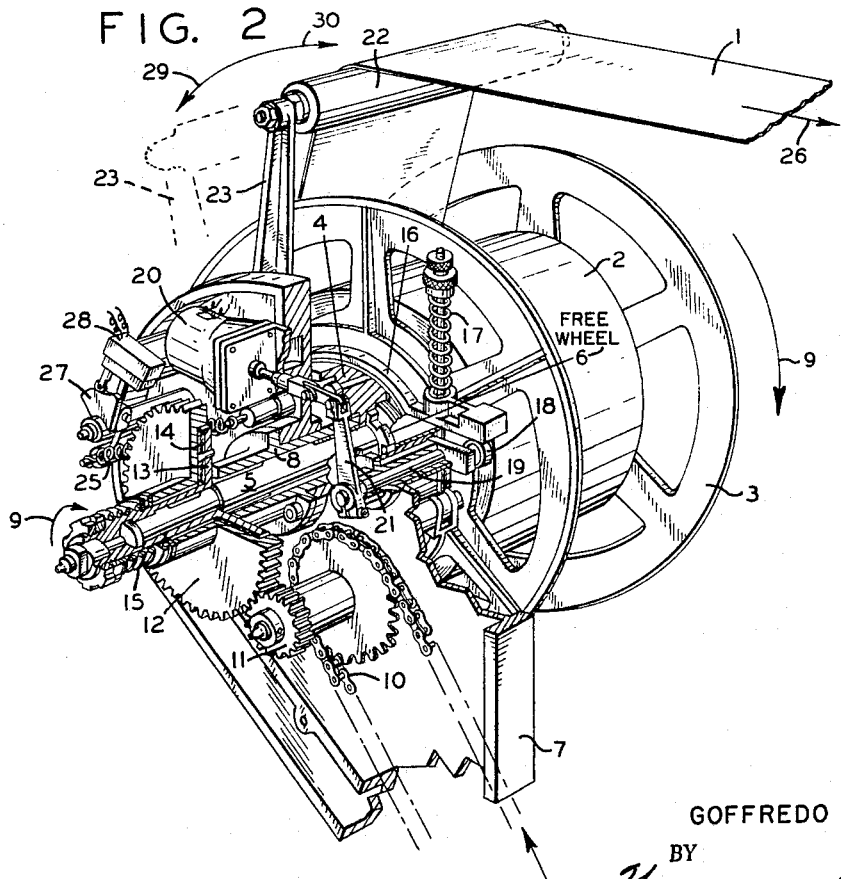
FIGURE 2 illustrates the same spool holder on a larger scale, seen from the opposite side and with some parts in action.

On strip 1 unwinding from spool 2 a traction is exerted in the direction of the arrow 26 by any suitable feed means (not illustrated) for example by two cooperating entraining rolls. Strip 1 passes over a tensioning roll 22 which is carried by an arm 23 oscillating about the fulcrum 24. A spring 25 strives to shift the oscillating arm 23 angularly in such manner as to urge the tensioning roll 22 toward the strip 1, that is, upward in the example of construction illustrated. Normally, however, the tractive effort exerted on strip 1 assumes a certain predetermined value and the tension of strip 1 maintains the tensioning roll 22 in a normal operating position, counter to the action of spring 25. This normal operating position is illustrated in solid lines in FIGURES 1 and 2.

The oscillating arm 23 of the tensioning roll 22 is integrally connected with a cam 27 which cooperates with an electric contact 28 forming part of the control circuit of the electromagnet 20. Normally, when the tensioning device 22, 23 of strip 1 is held in its normal operating position by a proper tension of said strip 1, cam 27 does not interfere with the contact 28, so that the electromagnet is excited and maintains the brake 16 released. If proper tensioning is achieved, micro switch 28 is normally closed, permitting current to flow through electromagnet 20, thereby holding brake 16 open through linkage 21 and 21a secured to shaft 19. When proper tensioning does not exist, one of the lobes on cam 27 actuates micro switch 28 breaking the circuit, hence electromagnet 20 becomes de-energized thereupon spring 17 forces brake shoe 16 against roller 18 on the end of linkage 21 so as to apply pressure against drum 4, thereby stopping reel 3 from rotating.

During operation, the diameter of spool 2 progressively decreases and the greater angular speed of spool 2, necessary to insure the same running speed of the strip 1, is readily assured by the traction exerted by said strip 1, owing to the free-wheel device 6.

When for any reason, for example due to an interruption in the feed of the cellophane strip 1 to the cellophaning or packaging machine, the traction exerted on strip 1 fails, the tension of the latter decreases below the pre-established value as the spool 2, 3 continues to rotate in the same direction of unwinding 9 because of the forced actuation on the part of shaft 5 through the free-wheel device 6. The tension of strip 1, therefore, no longer offsets the action of spring 25, so that the latter shifts the oscillating arm 23 of the tensioning roll 22 in the direction of arrow 29, and cam 27 actuates the electric contact 28 (see position of the tensioning device 22, 23, illustrated with broken lines in FIGURE 2). The actuation of contact 28 causes the de-excitation of the electromagnet 20, so that it lets go cam 18, and spring 17 applies brake 16 which arrests the rotation of the sleeve 4 and of the reel 3 and therefore stops spool 2. In this manner also, through the free-wheel device 6, the rotation of shaft 5 is arrested. The toothed wheel 12 is, however, maintained in rotation by the chain 10 and slips on the friction disk 13, 14 integral with the stopped shaft 5.

When the necessary tension of strip 1 is restored, for example when the movement of the feed rolls which cause the strip to advance resumes, the latter rotates the tensioning device in the direction of arrow 30 and brings it back to its normal operating position illustrated in the drawings. In this position, cam 27 lets go the electric contact 28 which again causes the excitation of the electromagnet 20. Brake 16 is then released counter to the action of spring 17, so that the forced actuation of the spool 2, 3 is resumed due to the toothed wheel 12 through the friction coupling 13, 14, shaft 5, and the free-wheel device 6, as described before. The spool 2, 3, therefore, is not set and maintained in motion only by the traction of the strip 1, but its inertia at the time of starting up and subsequent rotation is overcome mostly by the above-described forced actuation device, while the traction of the strip 1 must make up only the difference between the speed of forced rotation of the spool and the slightly greater speed of unwinding of strip 1. The spool may, therefore, have considerable dimensions and may thus offer a great moment of inertia, while the strip 1 may be made of delicate and easily tearable material.

Naturally the invention is not limited to the form of construction just described and illustrated, but may be widely varied and modified, especially in design.

Thus, for example, the tensioning device 22, 23 of strip 1 may be replaced by any other device sensitive to the tension of strip 1, while spool 2 may be actuated positively by means of any other mechanism which comprises a free-wheel device and a friction drive which latter may consist also of a belt drive or the equivalent. All without leaving the informative principle set forth above and hereafter claimed.

What is claimed is:

1. Apparatus for supporting and rotating a spool of strip material during the drawing of said material from said spool comprising, a rotatable shaft, drive means for continually rotating said shaft in the direction said strip is unwound, rotatable clutch means frictionally engaging said shaft, said clutch means being directly rotatable with said shaft when said shaft is driven at a predetermined speed and being independently rotatable relative to said shaft when said clutch means is rotated at a speed greater than the speed of said shaft, said spool being mounted on said clutch means to rotate directly therewith whereby the drawing of said strip material is accomplished under traction between said clutch and shaft.

2. The apparatus according to claim 1 wherein the clutch means comprises a free wheeling friction sleeve mounted about the driven shaft.

3. Apparatus according to claim 2 including means sensing the tension of the unwinding strip, a brake for arresting the rotation of the spool and means responsive to said sensing means to activate said brake when the tension of the strip drops below a certain limit.

4. Apparatus according to claim 3 wherein the brake is controlled by a spring and by an electromagnet, normally excited, and which is de-excited, applying the brake and stopping the spool, when the tension of the strip or thread unwinding from the spool drops below a certain limit.

5. Apparatus according to claim 4 in which the means sensitive to the tension of the strip or thread unwinding from the spool are formed by a movable oscillating tensioner, loaded by elastic means and acting on electric contacts which control the electromagnet of the brake of the spool.

References Cited by the Examiner

UNITED STATES PATENTS

| 2,168,023 | 8/1939 | Dymeck | 242—75.44 |
| 2,905,406 | 9/1959 | Falck-Pederson | 242—75.43 |

FRANK J. COHEN, *Primary Examiner.*

MERVIN STEIN, STANLEY N. GILREATH,
*Examiners.*

N. L. MINTZ, *Assistant Examiner.*